United States Patent
Zhang et al.

(10) Patent No.: US 11,025,371 B2
(45) Date of Patent: Jun. 1, 2021

(54) UE FEEDBACK FOR POINT-TO-MULTIPOINT TRANSMISSIONS

(71) Applicant: QUALCOMM Incorporated, San Diego, CA (US)

(72) Inventors: Xiaoxia Zhang, San Diego, CA (US); Peter Gaal, San Diego, CA (US); Xipeng Zhu, Beijing (CN); Jun Wang, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 126 days.

(21) Appl. No.: 15/537,395

(22) PCT Filed: Dec. 30, 2015

(86) PCT No.: PCT/CN2015/099750
§ 371 (c)(1),
(2) Date: Jun. 16, 2017

(87) PCT Pub. No.: WO2016/119559
PCT Pub. Date: Aug. 4, 2016

(65) Prior Publication Data
US 2017/0353273 A1 Dec. 7, 2017

(30) Foreign Application Priority Data
Jan. 30, 2015 (WO) ................ PCT/CN2015/071935

(51) Int. Cl.
*H04L 1/16* (2006.01)
*H04W 4/06* (2009.01)
(Continued)

(52) U.S. Cl.
CPC .......... *H04L 1/1671* (2013.01); *H04L 1/1816* (2013.01); *H04W 4/06* (2013.01); *H04W 72/04* (2013.01); *H04L 2001/0093* (2013.01)

(58) Field of Classification Search
None
See application file for complete search history.

(56) References Cited

U.S. PATENT DOCUMENTS

2006/0253601 A1 11/2006 Vedantham et al.
2007/0183434 A1* 8/2007 Pandey ................ H04L 12/189
370/401
(Continued)

FOREIGN PATENT DOCUMENTS

CN 101388755 A 3/2009
CN 101516061 A 8/2009
(Continued)

OTHER PUBLICATIONS

Supplementary European Search Report—EP15879757—Search Authority—The Hague—dated Aug. 17, 2018.
(Continued)

*Primary Examiner* — Jeffrey M Rutkowski
*Assistant Examiner* — Basil Ma
(74) *Attorney, Agent, or Firm* — Arent Fox, LLP

(57) ABSTRACT

A method, an apparatus, and a computer-readable medium for wireless communication are provided. In one configuration, the apparatus may be a UE. The UE receives PTM data from a base station. The UE attempts to decode the PTM data based on an identifier. The UE determines whether to transmit feedback information to the base station based on the attempt to decode the PTM data. In another configuration, the apparatus may be a base station. The base station transmits PTM data to a UE. The base station retransmits the PTM data to the UE based on feedback information associated with the transmitted PTM data.

28 Claims, 13 Drawing Sheets

Point-to-Multipoint Communications System

(51) Int. Cl.
 H04L 1/18 (2006.01)
 H04W 72/04 (2009.01)
 H04L 1/00 (2006.01)

(56) References Cited

U.S. PATENT DOCUMENTS

| | | | |
|---|---|---|---|
| 2011/0194511 A1 | 8/2011 | Chen et al. | |
| 2011/0280201 A1 | 11/2011 | Luo et al. | |
| 2013/0148563 A1* | 6/2013 | Brueck | H04W 4/06 370/312 |
| 2013/0163537 A1* | 6/2013 | Anderson | H04W 72/1284 370/329 |
| 2014/0355493 A1 | 12/2014 | Niu et al. | |
| 2015/0282208 A1* | 10/2015 | Yi | H04W 72/121 370/329 |
| 2017/0325198 A1* | 11/2017 | Adachi | H04W 72/04 |
| 2017/0325277 A1* | 11/2017 | Fujishiro | H04W 4/06 |

FOREIGN PATENT DOCUMENTS

| | | |
|---|---|---|
| CN | 102047699 A | 5/2011 |
| CN | 102892084 A | 1/2013 |
| CN | 103988559 A | 8/2014 |
| EP | 2400788 A2 | 12/2011 |
| EP | 2903312 A1 | 8/2015 |
| EP | 3051727 A1 | 8/2016 |
| EP | 3051734 A1 | 8/2016 |
| JP | 2004328498 A | 11/2004 |
| JP | 2014045526 A | 3/2014 |
| WO | 2008049449 A1 | 5/2008 |
| WO | 2009096305 A1 | 8/2009 |
| WO | 2009145688 A1 | 12/2009 |
| WO | 2011100326 A1 | 8/2011 |
| WO | 2014069946 A1 | 5/2014 |
| WO | 2014183279 A1 | 11/2014 |

OTHER PUBLICATIONS

International Preliminary Report on Patentability—PCT/CN2015/099750, The International Bureau of WIPO—Geneva, Switzerland, dated May 2, 2017.
International Search Report and Written Opinion—PCT/CN2015/071935—ISAEPO—dated Nov. 5, 2015.
International Search Report and Written Opinion—PCT/CN2015/099750—ISA/EPO—Apr. 1, 2016.
"3rd Generation Partnership Project; Technical Specification Group GSM/EDGE Radio Access Network; General Jacket Radio Service (GPRS); Mobile Station (MS)—Base Station System (BSS) Interface; Radio Link Control / Medium Access Control (RLC/MAC) Protocol (Release 11)", 3GPP TS 44.060 V11.8.0 (Mar. 2014), 20140305, pp. 1-630.
"3rd Generation Partnership Project; Technical Specification Group Radio Access Network; High Speed Downlink Jacket Access (HSDPA); Overall description; Stage 2 (Release 8)", 3GPP TS 25.308 V8.11.1 (Dec. 2011), 20111220, pp. 1-65.

* cited by examiner

UE FEEDBACK FOR POINT-TO-MULTIPOINT TRANSMISSIONS

CROSS-REFERENCE TO RELATED APPLICATION(S)

This application claims the benefit of International Application No. PCT/CN2015/071935, entitled "UE FEEDBACK FOR POINT-TO-MULTIPOINT TRANSMISSIONS" and filed on Jan. 30, 2015, which is expressly incorporated by reference herein in its entirety.

BACKGROUND

Field

The present disclosure relates generally to communication systems, and more particularly, to user equipment (UE) feedback for point-to-multipoint (PTM) transmissions.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer-readable medium, and an apparatus are provided. The apparatus may be a UE that receives PTM data from a base station. After receiving the PTM data, the UE attempts to decode the PTM data based on an identifier. The UE then determines whether to transmit feedback information to the base station based on the attempt to decode the PTM data.

In another aspect of the disclosure, a method, a computer-readable medium, and an apparatus are provided. The apparatus may be a base station that transmits PTM data to a UE. The base station retransmits the PTM data to the UE based on feedback information associated with the transmitted PTM data.

In an aspect, a method of wireless communication by a base station is provided. The method may include transmitting PTM data to a UE and retransmitting the PTM data to the UE based on feedback information associated with the transmitted PTM data. In an aspect, the retransmission may not be based on a hybrid automatic repeat request retransmission. In another configuration, the method may include receiving the feedback information from the UE based on the transmitted PTM data. In another aspect, the feedback information may be a negative acknowledgment or a report associated with the transmitted PTM data. In another configuration, the retransmitting the PTM data may include adjusting at least one of a modulation coding scheme, a transmission mode, or a number of retransmissions of the PTM data for retransmitting the PTM data based on the feedback information. In another configuration, the method may include transmitting a block error rate threshold and/or a measurement period to the UE to enable the UE to transmit the feedback information based on the BLER threshold and/or the measurement period.

In another aspect, an apparatus for wireless communication is provided. The apparatus may include means for transmitting PTM data to a UE and means for retransmitting the PTM data to the UE based on feedback information associated with the transmitted PTM data. In an aspect, the retransmission may not be based on a hybrid automatic repeat request retransmission. In another configuration, the apparatus may include means for receiving the feedback information from the UE based on the transmitted PTM data. In another aspect, the feedback information may be a negative acknowledgment or a report associated with the transmitted PTM data. In another configuration, the means for retransmitting the PTM data may be configured to adjust at least one of a modulation coding scheme, a transmission mode, or a number of retransmissions of the PTM data for retransmitting the PTM data based on the feedback information. In another configuration, the apparatus may include means for transmitting a BLER threshold and/or a measurement period to the apparatus to enable the apparatus to transmit the feedback information based on the BLER threshold and/or the measurement period.

In another aspect, an apparatus for wireless communication is provided. The apparatus may include a memory and at least one processor coupled to the memory and configured to transmit PTM data to a UE and to retransmit the PTM data to the UE based on feedback information associated with the transmitted PTM data. IN an aspect, the retransmission may not be based on a hybrid automatic repeat request retransmission. In another configuration, the at least one processor may be further configured to receive the feedback information from the UE based on the transmitted PTM data. In another aspect, the feedback information may be a negative acknowledgment or a report associated with the transmitted PTM data. In another configuration, the at least one processor may be configured to retransmit the PTM data by adjusting at least one of a modulation coding scheme, a transmission mode, or a number of retransmissions of the PTM data for retransmitting the PTM data based on the feedback information. In yet another configuration, the at least one processor may be further configured to transmit a block error rate threshold and/or a measurement period to the apparatus to enable the apparatus to transmit the feedback information based on the BLER threshold and/or the measurement period.

In another aspect, a computer-readable medium storing computer executable code for wireless communication is provided. The computer-readable medium may include code for transmitting PTM data to a UE and for retransmitting the PTM data to the UE based on feedback information associated with the transmitted PTM data. In an aspect, the retransmission may not be based on a hybrid automatic repeat request retransmission. In another configuration, the computer-readable medium may include code for receiving the feedback information from the UE based on the transmitted PTM data. In another aspect, the feedback information may be a negative acknowledgment or a report associated with the transmitted PTM data. In another configuration, the code for retransmitting the PTM data may include code for adjusting at least one of a modulation coding scheme, a transmission mode, or a number of retransmissions of the PTM data for retransmitting the PTM data based on the feedback information. In another configuration, the computer-readable medium may include code for transmitting a block error rate threshold and/or a measurement period to the UE to enable the UE to transmit the feedback information based on the BLER threshold and/or the measurement period.

DETAILED DESCRIPTION

Figure 1:
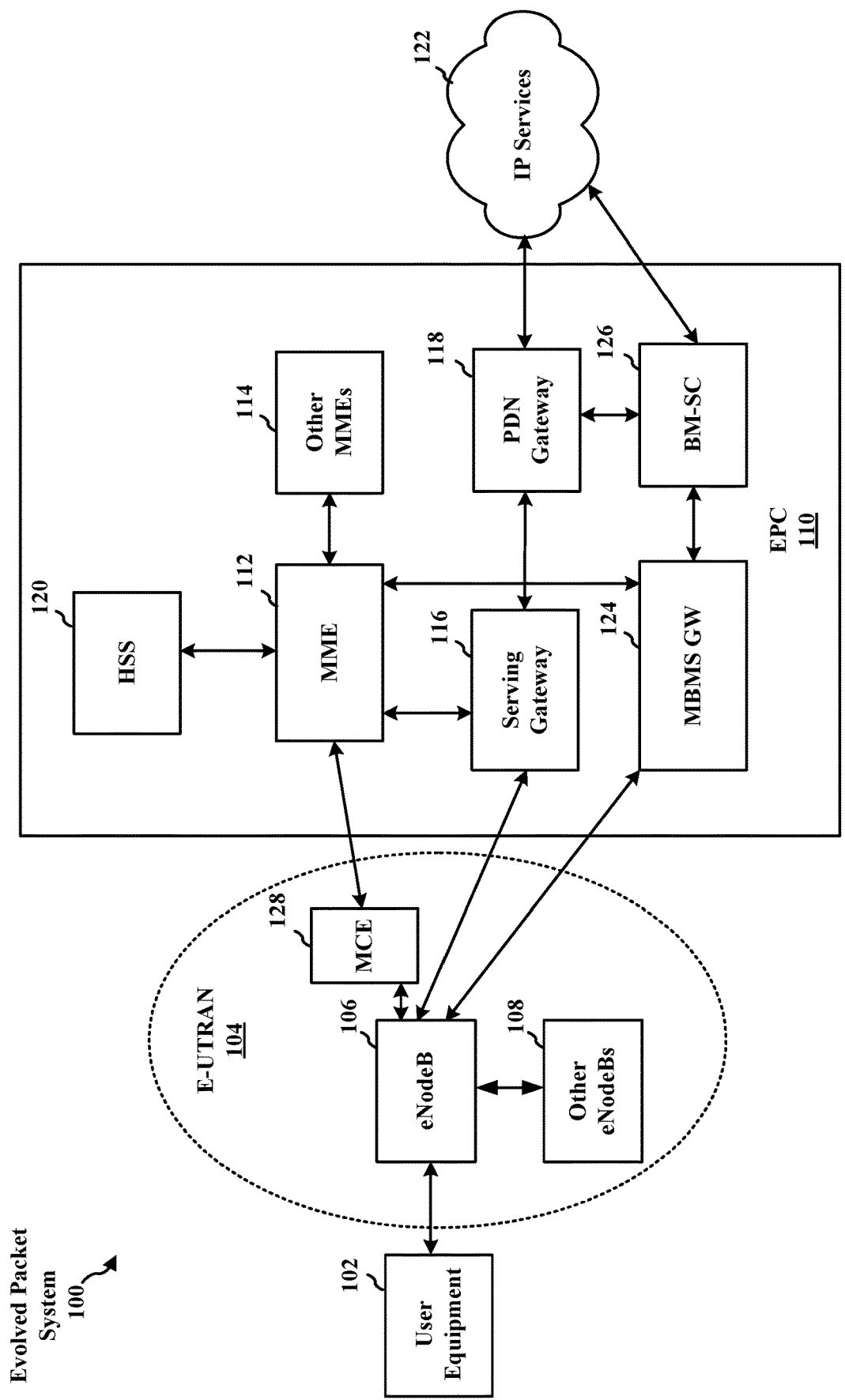
FIG. 1 is a diagram illustrating an example of a network architecture.

The detailed description set forth below in connection with the appended drawings is intended as a description of various configurations and is not intended to represent the configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108, and may include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
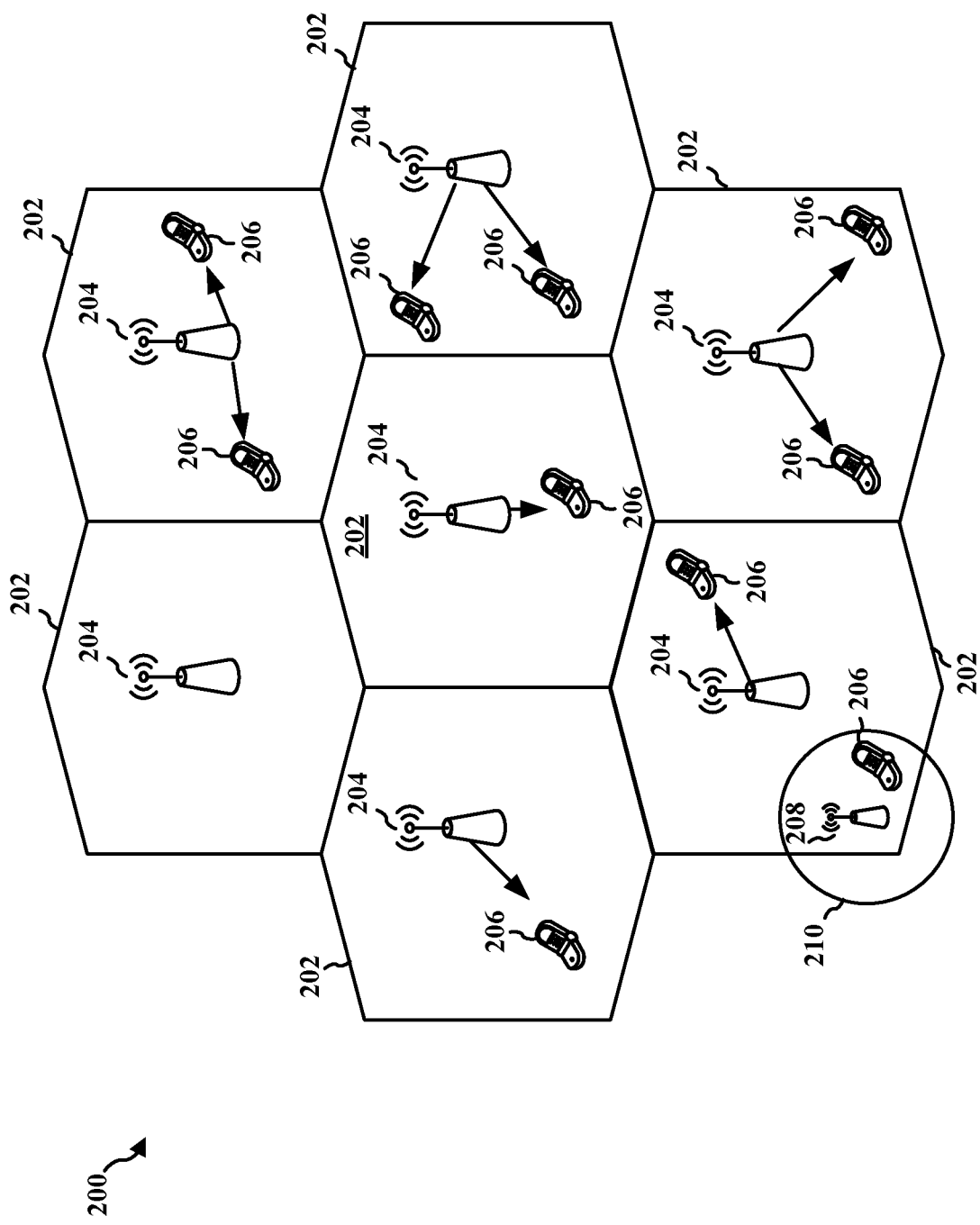
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sectors). The term "cell" can refer to the smallest coverage area of an eNB and/or an eNB subsystem serving a particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
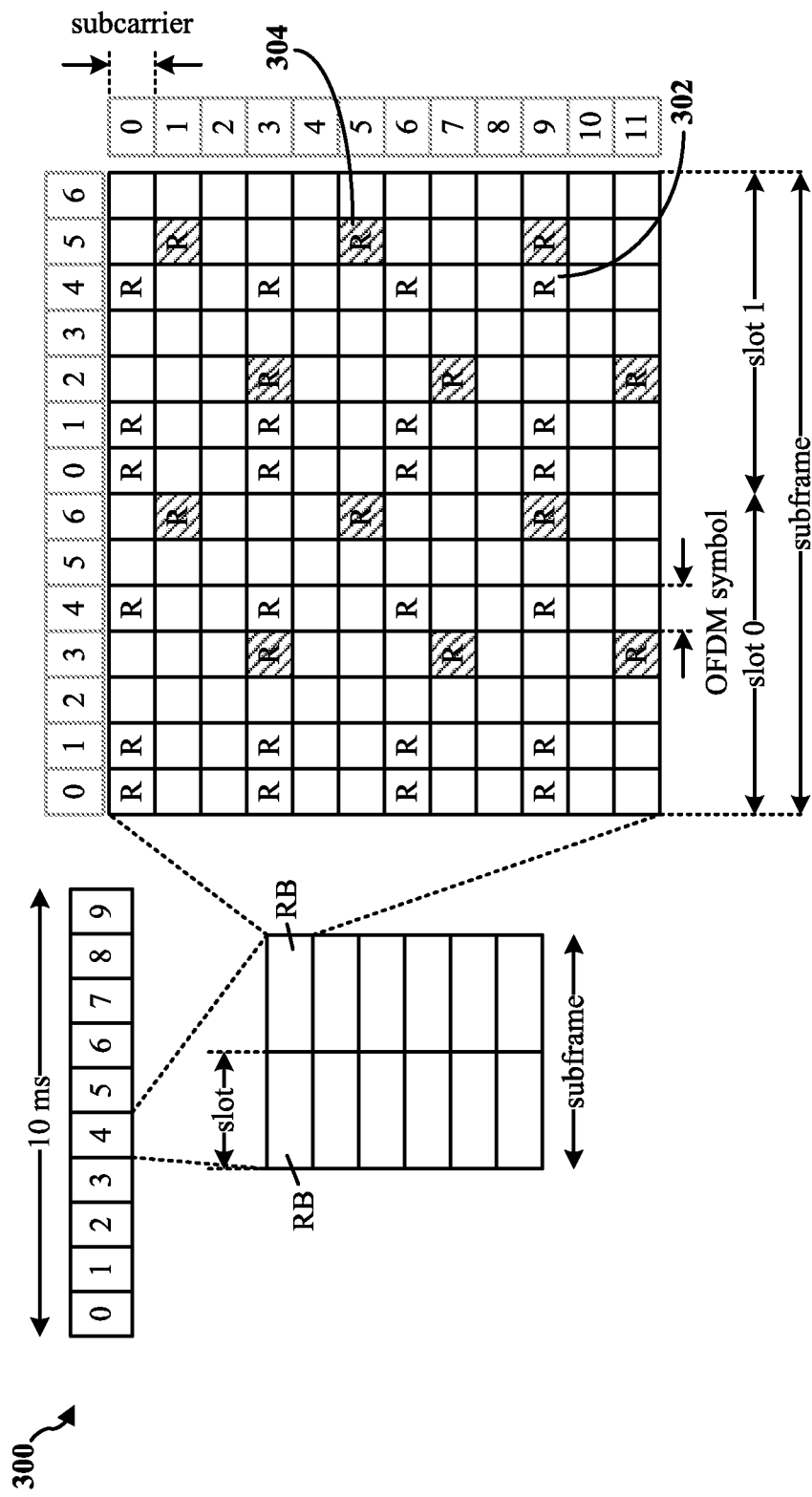
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, for a normal cyclic prefix, a resource block contains 12 consecutive subcarriers in the frequency domain and 7 consecutive OFDM symbols in the time domain, for a total of 84 resource elements. For an extended cyclic prefix, a resource block contains 12 consecutive subcarriers in the frequency domain and 6 consecutive OFDM symbols in the time domain, for a total of 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 is transmitted on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
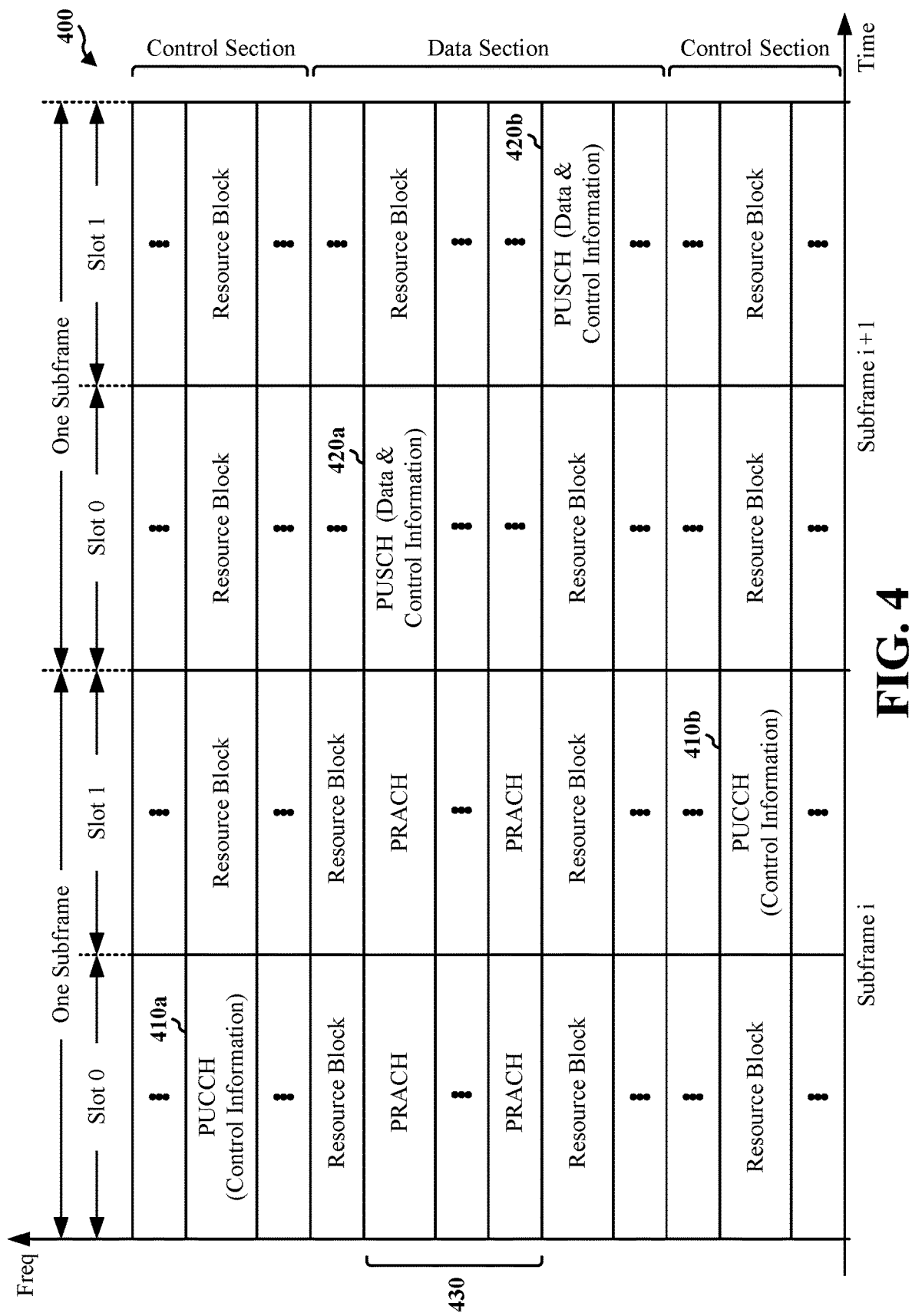
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make a single PRACH attempt per frame (10 ms).

Figure 5:
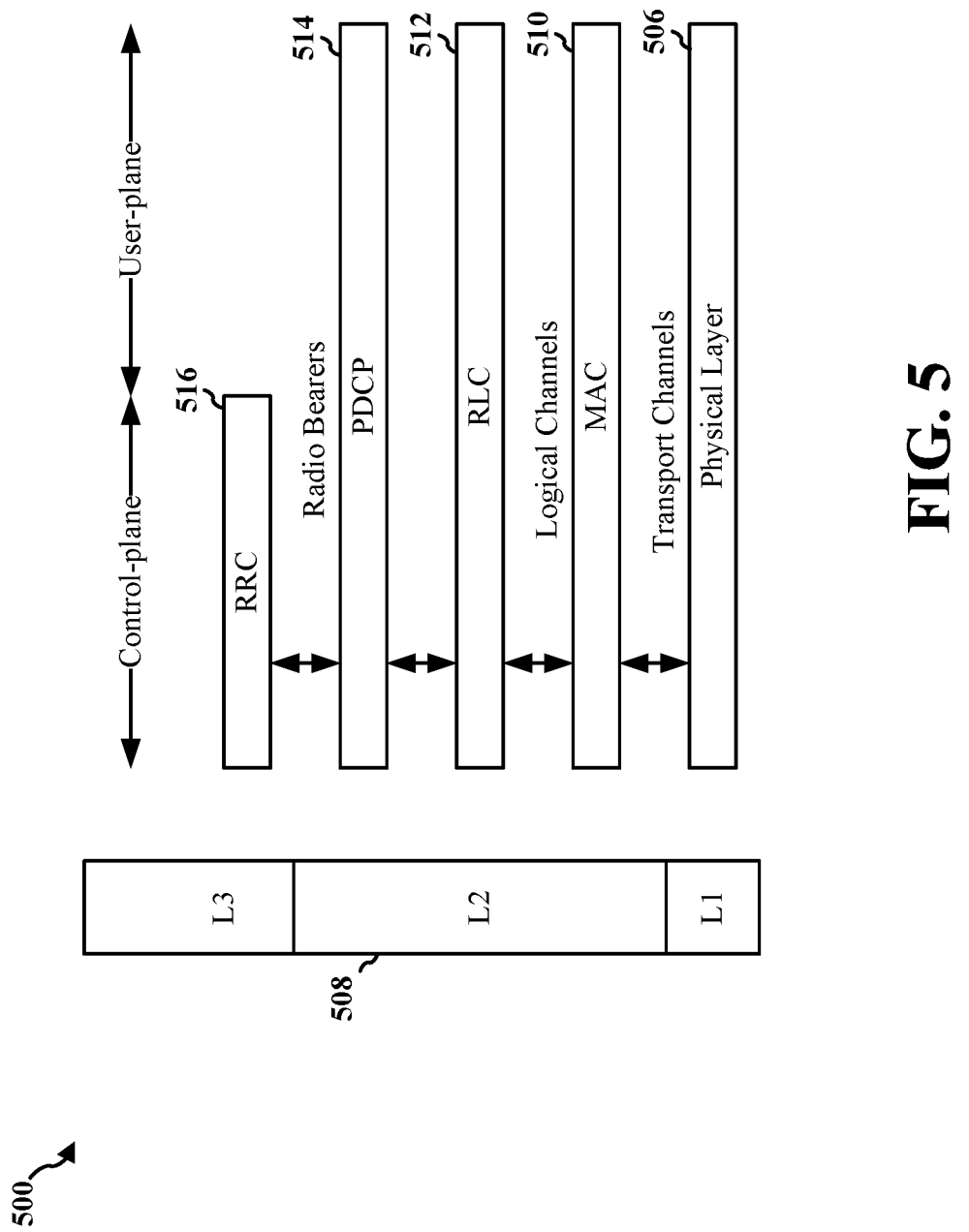
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
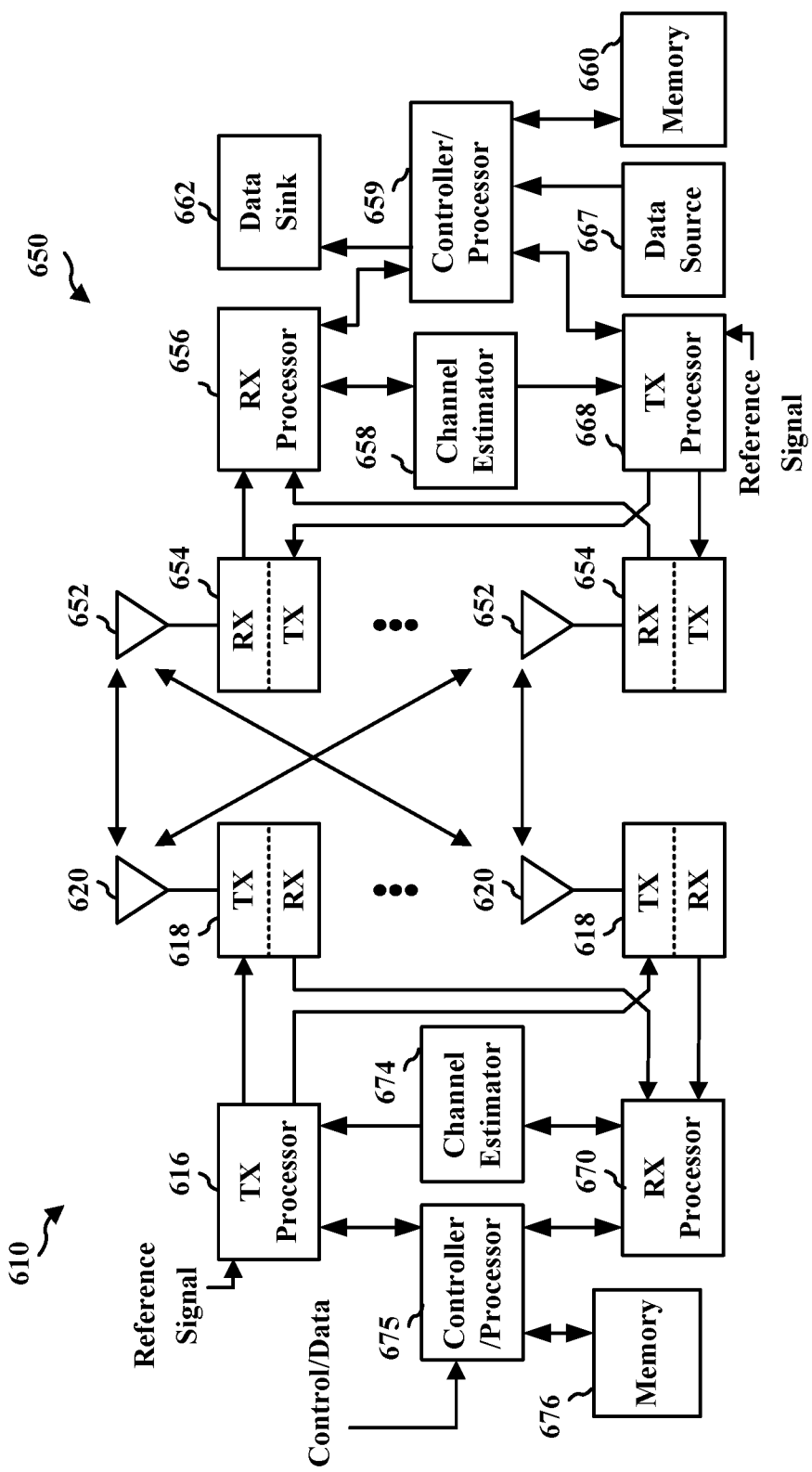
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Group communications, such as communications from a base station to multiple wireless devices (e.g., UEs), has become increasingly widespread. In a public safety context, group communications may be used to communicate public safety information to a group of police officers, firefighters, and/or medical personnel. In commercial use cases, group communications may be used to send videos, user applications, and/or real-time traffic information to multiple devices. Group communications may be accomplished using MBMS. In MBMS, multimedia may be transmitted by base stations belonging to a Multicast Broadcast Single Frequency Network (MBSFN) area. However, MBSFN areas and MBSFN subframe configurations may be relatively static. MBMS is well suited for environments with a large number of participating cells using cell synchronization. But in a single (or isolated) cell case with multiple users interested in receiving the same group communication service, MBMS may be less efficient. As discussed below, point-to-multipoint (PTM) transmission may be used to effectively transmit data in single cell scenarios. In PTM communications, data is transmitted from a single point (e.g., a base station) to multiple users via a shared common channel (e.g., a PDSCH). Resources for transmitting PTM communications may be more dynamically allocated via a PDCCH. PTM communications may also provide greater benefits than MBMS communications when cell synchronization is difficult due to area or operator configurations.

Figure 7:
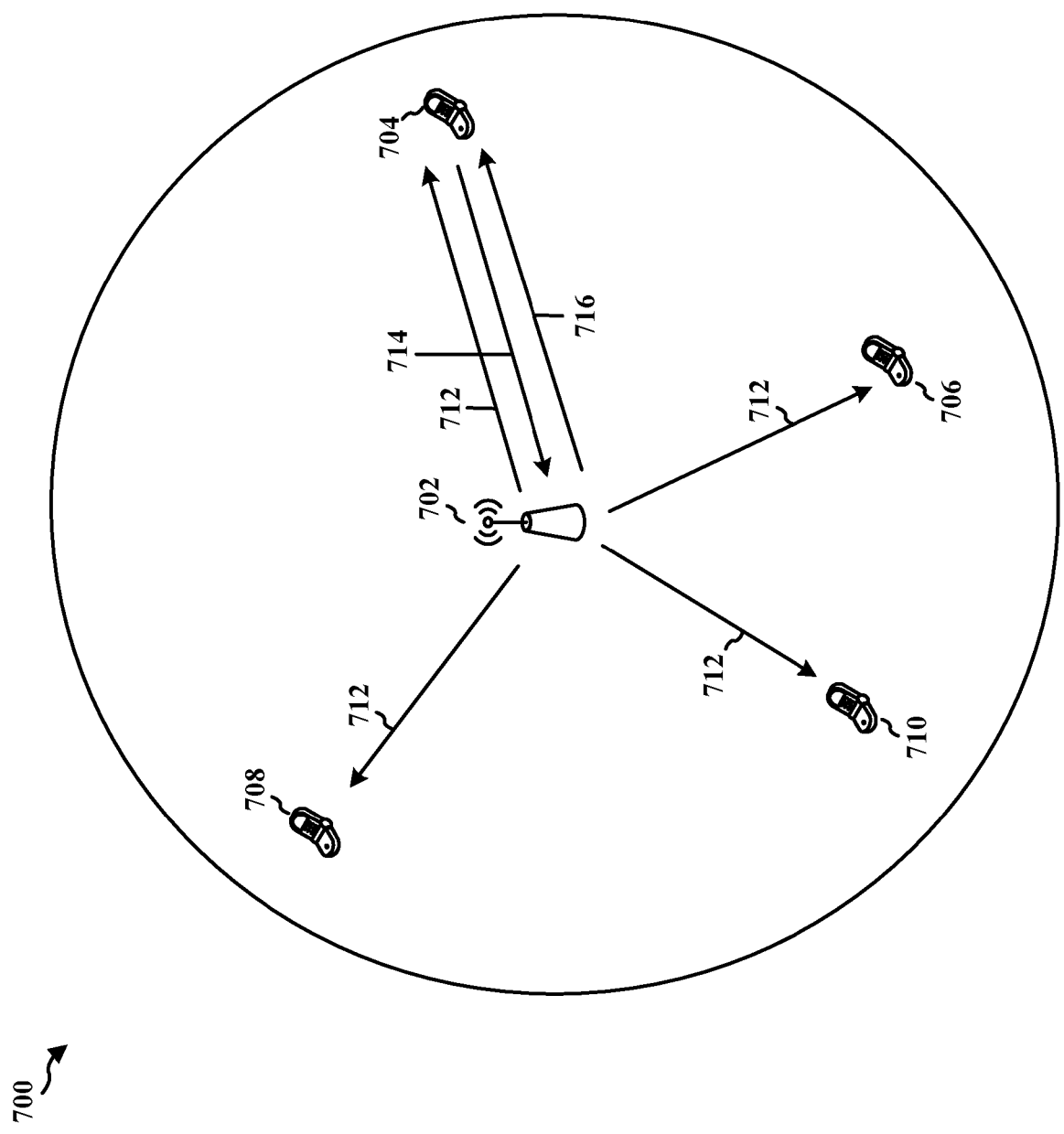
FIG. 7 is a diagram of a PTM communications system.

FIG. 7 is a diagram of a point-to-multipoint (PTM) communications system 700. The PTM communications system 700 may include a base station 702 and a number of UEs 704, 706, 708, 710. The UEs 704, 706, 708, 710 may be interested in receiving a data service or group call/service for critical communications related to public safety or for commercial applications (e.g., video downloads). The base station 702 may provide the requested data service to the UEs 704, 706, 708, 710 by transmitting 712 PTM data (via broadcast/multicast) to the UEs 704, 706, 708, 710. The PTM data may be transmitted 712 on resource blocks mapped to the PDSCH. All UEs 704, 706, 708, 710 that requested the PTM data may receive the PTM data on the same PDSCH. The PTM data may include a cyclic redundancy check (CRC) that is encoded (or scrambled) based on an identifier. In an aspect, the identifier may be a group radio network temporary identifier (G-RNTI), which may be received from a network via the base station 702. The identifier may be unique to the data service (e.g., a PTM data service or group service) requested by the UEs 704, 706, 708, 710, and the identifier may also be unique within an area served by the base station 702. In an aspect, the identifier may be associated with a group of UEs interested in receiving the same data service (e.g., policemen, firefighters, etc.) All UEs 704, 706, 708, 710 requesting the data service may decode the PTM data with the same identifier (or G-RNTI).

After the base station 702 transmits 712 the PTM data, the UE 704, for example, may receive the PTM data on the PDSCH and attempt to decode the PTM data based on the identifier used to scramble the CRC of the PTM data. In an aspect, the UE 704 may receive configuration information from the base station 702 that indicates one or more identifiers corresponding to a particular data service that the UE 704 wants to receive. The UE 704 may determine the appropriate identifier to be used for decoding the PTM data based on the type of service requested. After determining the appropriate identifier, the UE 704 may attempt to decode the CRC included in the PTM data and determine whether any errors are detected.

Depending on whether the UE 704 successfully decodes the PTM data, the UE 704 may determine whether to provide feedback information 714 to the base station 702 based on the decoding attempt. In one configuration, if the UE 704 successfully decodes the PTM data based on the identifier, the UE may send feedback information 714 to the base station 702 indicating that the PTM data was successfully received and decoded. In one configuration, the feedback information 714 may be an acknowledgement (ACK). Alternatively, the UE 704 may not transmit the feedback information 714 despite successfully decoding the PTM data. In another configuration, the feedback information 714 may include channel quality information.

In another configuration, if the UE 704 does not successfully decode the PTM data based on the identifier, the UE 704 may transmit feedback information 714 to the base station 702 indicating that the PTM data was not received and decoded successfully. In an aspect, the feedback information 714 may be a NACK. In another aspect, the UE 704 may transmit feedback information 714 on an uplink resource mapped to an uplink control channel such as the PUCCH, and the PUCCH may be associated with the identifier. The UE 704 may identify the uplink resource based on a downlink control channel message, such as a downlink control information (DCI) message, received from the base station 702. The downlink control channel message may be received in the PDCCH. Each PDCCH message (e.g., the DCI message) associated with the group service requested by the UE 704 may include a CRC that is scrambled with the identifier (e.g., a PDCCH G-RNTI). The PDCCH may indicate resources in the PDSCH upon which the base station 702 will transmit the PTM data. By decoding the PDCCH with the identifier, the UE 704 may determine when the PTM data is scheduled on the PDSCH. The UE 704 may also determine, based on the PDCCH, which uplink resource to transmit 712 the feedback information 714 on the PUCCH. In an aspect, the UE 704 may determine which PUCCH resource to transmit on based on a control channel element (CCE) index included in the PDCCH associated with the identifier (e.g., the G-RNTI). In an aspect, the CCE index may identify a resource within a set of consecutive resources.

In another aspect, when UE 704 determines to send feedback information 714 (e.g., ACK/NACK) based on whether the UE 704 successfully decodes the PTM data, the UE 704 may send the ACK on one PUCCH resource and send the NACK on a different PUCCH resource. For example, the UE 704 may determine which PUCCH resource to transmit on based on a CCE index included in the PDCCH associated with the identifier (e.g., the G-RNTI) to send ACK/NACK, and the network may configure another PUCCH resource for the UE 704 to send NACK/ACK. The additional PUCCH resource can be signaled in the configuration information for each G-RNTI (e.g., a single cell PTM (SC-PTM) configuration message). In another aspect, all UEs that correctly decode PTM data may have a common UL resource to send the ACK, while all UEs that fail to decode the PTM data may have a different common UL resource to send the NACK.

In another aspect, instead of dynamic scheduling using the DCI messages in the PDCCH, semi-persistent scheduling (SPS) may be used. SPS enables the base station 702 to semi-statically configure and allocate wireless resources to the UE 704 for a longer time period than one subframe. If SPS is configured, the UE 704 may be configured to receive up to 4 semi-static uplink resources on the PUCCH. Upon receiving a PDCCH scrambled based on an SPS G-RNTI, the UE 704 may decode the PDCCH based on the SPS identifier (e.g., an SPS G-RNTI) and determine which uplink resource of the 4 uplink resources may be used by the UE 704 for transmitting the feedback information 714. For example, the SPS signaling may include a set of bits (e.g., 2 bits) that identifies 1 of 4 resources that may be used to transmit the feedback information 714. The UE 704 may identify SPS signaling intended for the UE 704 because the SPS signaling may be associated with an SPS identifier used to scramble the CRC in the PTM data. In an aspect, the SPS identifier may be an SPS G-RNTI (as opposed to a PDCCH G-RNTI when SPS is not configured). In another aspect, when the UE 704 sends the feedback information (e.g., ACK/NACK) based on whether the UE 704 successfully decodes the PTM data, the additional PUCCH resource for transmitting the feedback information may be signaled in the SC-PTM configuration for each G-RNTI.

In another aspect, the UE 704 may receive the PTM data on a secondary component carrier associated with a secondary serving cell in the base station 702. In this aspect, the base station 702 may semi-statically (or semi-persistently) configure one or more resources on the PUCCH on a primary serving cell for transmitting the feedback information 714. The UE 704 may transmit feedback information 714 (e.g., an ACK/NACK) on a primary component carrier associated with the primary serving cell in the base station 702. Although this example provides that the primary serving cell and the secondary serving cell may be associated with the same base station 702, the primary serving cell and the secondary serving cell may also be associated with different base stations.

In another aspect, a DCI message received on the PDCCH may include a power control command, such as one or more transmit power control (TPC) bits, that indicate the power level at which uplink information is to be transmitted to the base station 702 on the PUCCH (and/or PUSCH). In an aspect, when the UE 704 receives a PDCCH that includes a CRC scrambled with the identifier (e.g., the PDCCH G-RNTI) associated with the data service/group call, the UE 704 may ignore the power control command in the DCI message when transmitting the feedback information 714 to the base station 702. Alternatively, the network can configure multiple PUCCH resources for the UE 704 to transmit feedback for SC-PTM and the TPC bits may be reused for UE to determine which UL resource is used to transmit feedback. In this aspect, the TPC bits may serve a dual purpose of signaling a transmit power as well as indexing (or identifying) an uplink resource for transmitting feedback.

In another aspect, the UE 704 may receive the PTM data and transmit the feedback information 714 to the base station 702 while the UE 704 is in an idle mode/state. Because the UE 704 may already be configured with the identifier, the UE 704 need not be in a connected mode to receive the PTM data. While in an idle mode, the UE 704 may decode a PDCCH having a CRC scrambled with the identifier to in order to identify resources on which to receive the PTM data on the PDSCH. The UE 704 may transmit the feedback information 714 in idle mode when the UE 704 is in a small cell where the timing adjustment (or timing advance) is small. In small cells, the timing synchronization for idle UEs may not be an issue.

In another aspect, the UE 704 may receive the PTM data while the UE 704 is at a low power level. If the UE 704 unsuccessfully decodes the PTM data, the UE 704 may transmit the feedback information 714 based on the unsuccessful decoding. However, if the UE 704 also has data or control information to send on the PUSCH, the UE 704 may prioritize either the PUSCH transmission or the feedback information 714 transmission on the PUCCH. In one aspect, when the power level is low and the UE 704 has both a PUSCH transmission and feedback information 714 to transmit, the UE 704 may send the PUSCH transmission and use the remaining power to transmit the feedback information 714. If insufficient power remains after the PUSCH transmission, the UE 704 may not transmit the feedback information 714. In another aspect, the UE 704 may transmit the feedback information 714 and use any remaining power to transmit the PUSCH. If insufficient power remains after the PUCCH transmission, the UE 704 may not transmit the PUSCH.

In another configuration, the UE 704 may have unicast control information to transmit at the same time as the feedback information 714 (e.g., an ACK/NACK). Unicast control information may include a channel quality indicator (CQI), a scheduling request, a unicast ACK, a unicast NACK, or other unicast control information. In one aspect, the UE 704 may determine not to transmit the feedback information 714 (e.g., an ACK/NACK) for the PTM data and transmit the unicast control information instead. In another aspect, the UE 704 may determine to refrain from transmitting unicast control information and, instead, transmit the feedback information 714 for the PTM data. In this aspect, the feedback information 714 may be transmitted in an uplink channel resource (e.g., a resource mapped to the PUCCH) associated with the identifier (e.g., PDCCH G-RNTI or SPS G-RNTI). In yet another aspect, the feedback information 714 may be transmitted jointly with the unicast control information. In one example, the feedback information 714 may be transmitted on a scheduling request resource when the UE 704 wants to send a scheduling request. In another example, the feedback information 714 may be transmitted jointly with a unicast ACK or NACK if both are using a rank 1 transmission (e.g., 1 spatial layer). The unicast ACK/NACK may be multiplexed with the feedback information 714 for a rank 2 transmission (e.g., 2 spatial layers). The feedback information 714 may be dropped or discarded if rank 2 is used for either unicast or PTM data transmission. In another example, the feedback information 714 may be transmitted on a CQI resource if the UE 704 needs to report a CQI. In another example, the feedback information 714 may be jointly encoded with the unicast ACK or NACK if format 3 is configured for PUCCH. Format 3 supports multiple ACK/NACKs.

To transmit the feedback information 714 with the unicast control information, however, the base station 702 may need to know that the UE 704 is receiving a particular group service (or data service) in order to know that both unicast control information and feedback information 714 is included in the individual UE resource. As such, the UE 704 may transmit or report information to the base station 702, and the information may indicate that the UE 704 is receiving a particular group service. In an aspect, the information may be a temporary mobile group identifier (TMGI) that may uniquely identify a PTM data service (e.g., there may be a one-to-one mapping between G-RNTI and TMGI). If the UE 704 does not transmit information to the base station 702 to indicate that the UE 704 was receiving a group service, the base station 702 may expect only unicast control information with 2 bits, for example. When the feedback information 714 is transmitted with the unicast control information, the base station 702 may need to know the number of bits to expect to properly decode both the unicast control information and the feedback information 714. In an example, if the feedback information 714 has 1 bit, then the information transmitted to the base station 702 may indicate to the base station 702 that 3-bits of control information are to be decoded.

In yet another aspect, the UE 704 may transmit the feedback information 714 in parallel with the unicast control information. In this aspect, the feedback information 714 may be transmitted in the uplink PUCCH resource associated with the identifier (e.g., G-RNTI) and the unicast control information may be transmitted in an uplink PUCCH resource associated with a unicast PUCCH resource associated with a different RNTI (e.g., a cell radio network temporary identifier (C-RNTI)).

In another configuration, the UE 704 may want to transmit unicast data at the same time as the feedback information 714. In an aspect, the UE 704 may determine not to transmit the feedback information 714 for the PTM data when the UE 704 has unicast data to transmit. In another aspect, the UE 704 may transmit the feedback information 714 in parallel with the unicast data. The feedback information 714 may be transmitted on a resource mapped to the PUCCH and identified in the PDCCH scrambled with the identifier (e.g., PDCCH G-RNTI). The unicast data may be transmitted on a resource mapped to the PUSCH and identified in the PDCCH scrambled with a different identifier (e.g., C-RNTI).

In another configuration, the UE 704 may transmit feedback information 714 opportunistically. That is, the UE 704 may determine whether to transmit feedback information 714 based on whether the UE 704 has unicast data or unicast control information to transmit. In one aspect, when the UE 704 does not have either unicast data or unicast control information to transmit, the UE 704 may transmit the feedback information 714. In another aspect, the UE 704 may refrain from transmitting feedback information 714 when the UE 704 has either unicast data or unicast control information to transmit.

In another configuration, the UE 704 may not transmit the feedback information 714 regardless of whether the UE 704 successfully decodes the PTM data received in the PDSCH.

Although the feedback information 714 has thus far been discussed as an ACK or NACK, the feedback information 714, indicating whether the PTM data was successfully received and decoded, may also be a report such as a reception report, an RRC feedback report, or a minimize driving test (MDT) report. The feedback information 714 may be a report when the UE 704 is not configured to send a NACK for the PTM data. In one aspect, the UE 704 may use a reception report (e.g., a service layer reception report) to indicate whether the PTM data was successfully received and/or decoded. The reception report may indicate whether the PTM data is received via MBMS or PTM. The reception report may also indicate a primary serving cell ID and/or a secondary serving cell ID where the PTM data is received. In some instances, a core network entity may indicate the reception report to the base station 702.

In another aspect, the UE 704 may use an RRC feedback report or an MDT report to convey the reception status to the network. In this aspect, the UE 704 can transmit the RRC feedback report or MDT report to the base station 702. Either report may include a first number of data packets received by the UE 704 with a CRC scrambled with the identifier (e.g., the G-RNTI) and a second number of successfully decoded data packets associated with the identifier. The report may also include the BLER (block error rate) experienced by the UE 704 with respect to the PTM data.

In an aspect, the base station 702 may trigger the RRC feedback report or the MDT report by indicating to the UE 704 when the report should be sent. The base station 702 may configure the block error rate (BLER) threshold, a measurement period, and/or a measurement timer by transmitting configuration information to the UE 704. The configuration information may include the BLER threshold, the measurement period, and/or the measurement timer. In one example, when the UE 704 receives PTM data with a BLER higher than the BLER threshold, the UE 704 may transmit the RRC feedback report, for example. In another example, when the UE 704 experiences a BLER that is higher than the BLER threshold within the measurement period, then the UE 704 may transmit the RRC feedback report. However, if the UE 704 experiences a BLER that is higher than the BLER threshold while outside the measurement period, the UE 704 may not transmit the RRC feedback report. In yet another example, if the UE 704 experiences a BLER that is higher than the BLER threshold and the measurement timer has expired since the last report was transmitted, the UE 704 may transmit the RRC feedback report. In yet another example, if either the BLER is below the BLER threshold or the measurement timer has not expired, the UE 704 may not transmit the RRC feedback report.

Upon receiving the feedback information 714, the base station 702 may utilize the feedback information 714 to retransmit 716 the PTM data to the UE 704. As previously discussed, the feedback information 714 may be a NACK or a report (e.g., reception report, RRC feedback report, or MDT report). In one configuration, the base station 702 may adjust an MCS, a transmission mode configuration (e.g., transmit from single antenna port, transmit diversity, spatial multiplexing, MIMO, etc.), and/or a number of retransmissions (e.g., 2 retransmissions) based on the feedback information 714. The adjusted MCS may be applied to the group of UEs receiving PTM data. The base station 702 may transmit 716 the PTM data based on an adjusted MCS or transmission mode configuration for a fixed number of times. In an aspect, the base station 702 may not retransmit the PTM data using HARQ retransmission. In HARQ based retransmission, the PTM data would be retransmitted each time a NACK is received. Nevertheless, a fixed (or predetermined) number of retransmissions with respect to be PTM data may be allowed. The retransmissions may be contiguous (e.g., retransmissions occur one after the other without other data transmissions in between) or non-contiguous (e.g., other data transmissions may occur in between retransmissions).

In another configuration, the base station 702 may retransmit 716 the PTM data when the base station 702 receives the feedback information 714 indicating that the PTM data was not successfully decoded. In an aspect, if the UE 704 receives the PTM data on the secondary serving cell, the UE 704 may transmit the feedback information 714 on the primary serving cell, which may have a different TDD uplink/downlink configuration than the secondary serving cell. In this aspect, the secondary serving cell may need to wait for the longest response time (e.g., 15 ms based on TDD) for one or more of the remaining UEs 706, 708, 710 to send feedback information before transmitting the PTM data. In this aspect, the UE 704 may buffer the PTM data upon determining that the PTM data was not successfully decoded. The UE 704 may buffer the PTM data for a period of time based on a delay. The delay may be based on a first time delay associated with the amount of time the remaining UEs 706, 708, 710 may use to transmit feedback information and a second time delay associated with the amount of time the secondary serving cell waits before retransmitting 716 the PTM data. In an aspect, a number of HARQ interlaces for G-RNTI may be based on the longest delay, and the soft buffer bits may account for the maximum number of HARQ interlaces. In another aspect, if simultaneous C-RNTI and G-RNTI reception is supported, a separate soft buffer is needed—one for retransmissions associated with a C-RNTI and another for retransmissions associated with a G-RNTI.

In an aspect, the base station 702 may transmit 714 the PTM data to all subscribers (e.g., UEs 704, 706, 708, 710) or a subset of UEs (e.g., UEs 704, 706) within a geographical area. The base station 702 may determine which UEs receive the data service based on a service subscription level (e.g., service subscription associated with public safety personnel or service subscription with premium video downloads).

Although FIG. 7 illustrates the UE 704 transmitting the feedback information 714 for the PTM data to the base station 702, any number of UEs (e.g., the UEs 706, 708, 710) may also respectively transmit feedback information to the base station 702 for purposes of enabling the base station 702 to retransmit the PTM data. For example, if the UEs 706, 708, 710 are part of the same group as the UE 704 for receiving a group service, the UEs 706, 708, 710 may also send feedback information (e.g., an ACK/NACK) on the same PUCCH resource as the UE 704. Because the UEs 704, 706, 708, 710 transmit feedback information on the same uplink resource, the UEs 704, 706, 708, 710 cannot transmit both an ACK and a NACK because this would confuse the base station 702. As discussed supra, UEs may elect not to transmit ACK and only transmit NACK when the PTM data is not successfully decoded.

FIG. 800 is a flow chart 800 of a method of wireless communication. The method may be performed by a UE (e.g., the UEs 704, 706, 708, 710, the apparatus 1002/1002' infra). At 802, the UE may receive PTM data from a base station. For example referring to FIG. 7, the UE 704 may receive PTM data from the base station 702.

At 804, the UE may attempt to decode the PTM data based on an identifier. For example, referring to FIG. 7, the UE 704 may attempt to decode the PTM data based on a G-RNTI (e.g., a PDCCH G-RNTI or a SPS G-RNTI if SPS is configured). The UE 704 may descramble the CRC based on the G-RNTI and determine if there are any errors in the PTM data.

At 806, the UE may determine whether to transmit feedback information to the base station based on the attempt to decode the PTM data. The determination may be further based on whether the UE has unicast data or unicast control information to transmit. For example, referring to FIG. 7, the UE 704 may determine whether to transmit a NACK to the base station 702 based on an unsuccessful attempt to decode the PTM data. If the UE 704 has either unicast data or unicast control information to transmit, the UE 704 may determine to refrain from transmitting the NACK. But if the UE 704 does not have unicast information to transmit, the UE 704 may determine to transmit the NACK. In another example, referring to FIG. 7, if a NACK is not available, the UE 704 may transmit a RRC feedback report if the UE 704 experiences a BLER above a BLER threshold within a measurement period.

At 808, the UE may transmit information indicating that the UE is receiving a particular group service. For example, referring to FIG. 7, the UE 704 may transmit information indicating that the UE 704 is receiving a group service associated with public safety information for police officers.

At 810, the UE may attempt to transmit the feedback information for the PTM data to the base station when the UE does not decode the PTM data successfully. For example, referring to FIG. 7, the UE 704 may attempt to transmit a NACK to the base station 702 for the PTM data when the UE 704 does not successfully decode the PTM data. If the UE 704 has other transmissions (e.g., unicast control or unicast data) that take priority over the NACK transmission, the UE 704 may refrain from transmitting the NACK.

At 812, the UE may transmit (or attempt to transmit) the feedback information. The feedback information may be one of a reception report, an RRC feedback report, or an MDT report. For example, referring to FIG. 7, the UE 704 may transmit or (attempt to transmit) the RRC feedback report to the base station 702 when the UE 704 does not decode the PTM data successfully within the measurement period.

Finally, at 814, the UE may attempt to buffer the PTM data based on a delay. For example, referring to FIG. 7, if the base station 702 transmits the PTM data on a secondary serving cell, the UE 704 may transmit feedback information on a primary serving cell and buffer the PTM data based on a delay. The delay may be based on a time window allotted for other UEs to transmit feedback information and a time needed for the secondary serving cell to retransmit the PTM data after receiving feedback information. The buffered PTM data may be combined with the retransmitted PTM data.

Figure 9:
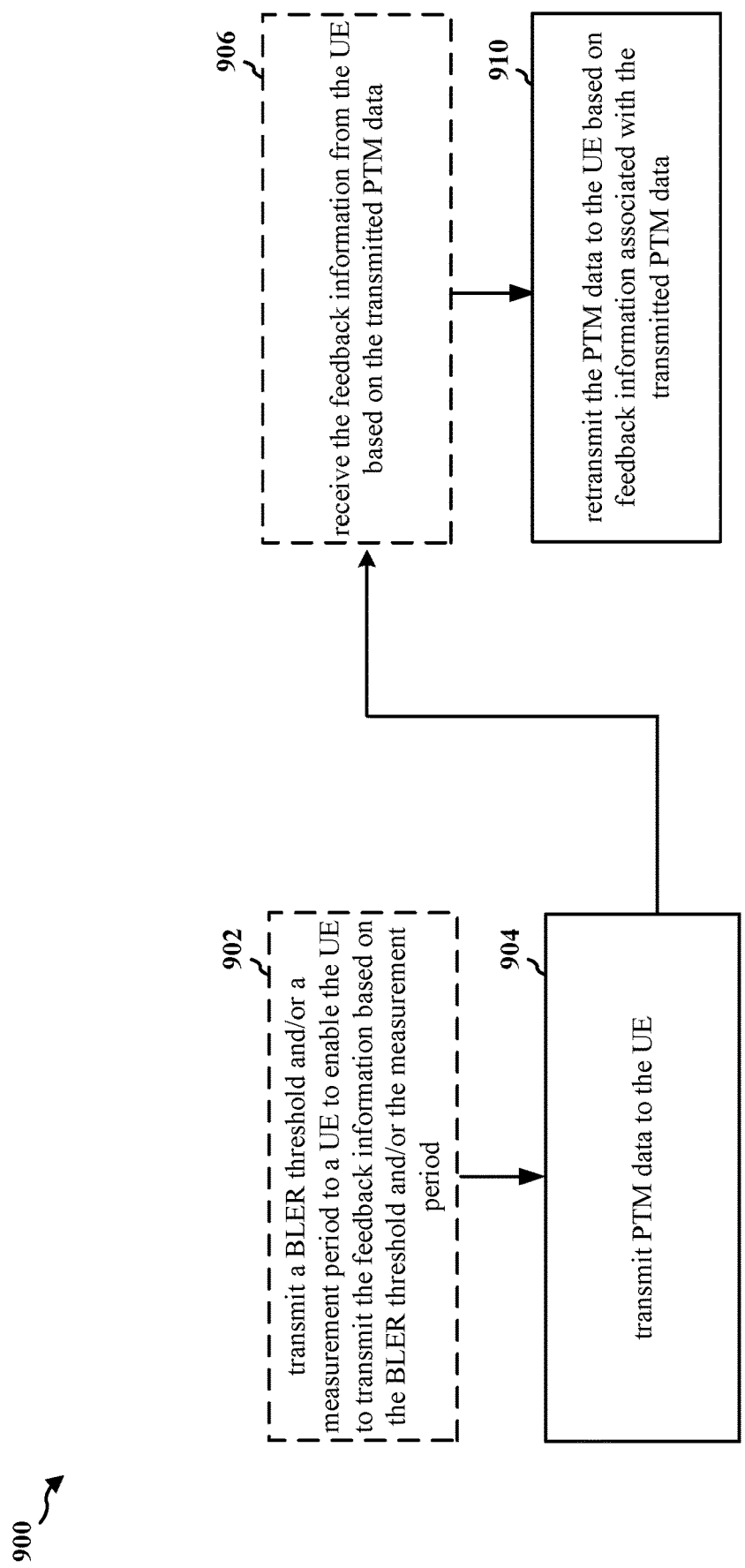
FIG. 9 is a flow chart of a method of wireless communication.

FIG. 9 is a flow chart 900 of a method of wireless communication. The method may be performed by a base station (e.g., an eNB, the base station 702, the apparatus 1202/1202'). At 902, the base station may transmit a BLER threshold and/or a measurement period to a UE to enable the UE to transmit the feedback information (e.g. reports) based on the BLER threshold and/or the measurement period. For example, referring to FIG. 7, the base station 702 may transmit a BLER threshold and/or a measurement period to the UE 704.

At 904, the base station may transmit PTM data to the UE. For example, referring to FIG. 7, the base station 702 may transmit 712 PTM data to the UE 704.

At 906, the base station may receive the feedback information from the UE based on the transmitted PTM data. For example, referring to FIG. 7, the base station 702 may receive feedback information 714 from the UE 704 based on the transmitted 712 PTM data. The feedback information 714 may be a NACK indicating that the PTM data was not successfully decoded based on a PDCCH G-RNTI.

At 910, the base station may retransmit the PTM data to the UE based on feedback information associated with the transmitted PTM data. For example, referring to FIG. 7, the base station 702 may retransmit the PTM data to the UE 704 based on the NACK associated with the transmitted PTM data. In an aspect, the NACK may indicate to the base station 702 that the transmission parameters for the PTM data should be adjusted. As such, the base station 702 may determine to retransmit the PTM data a fixed number of times (e.g., 3 times). Additionally, the base station may retransmit the PTM data using a different MCS than the initial MCS used in the first PTM data transmission.

Figure 10:
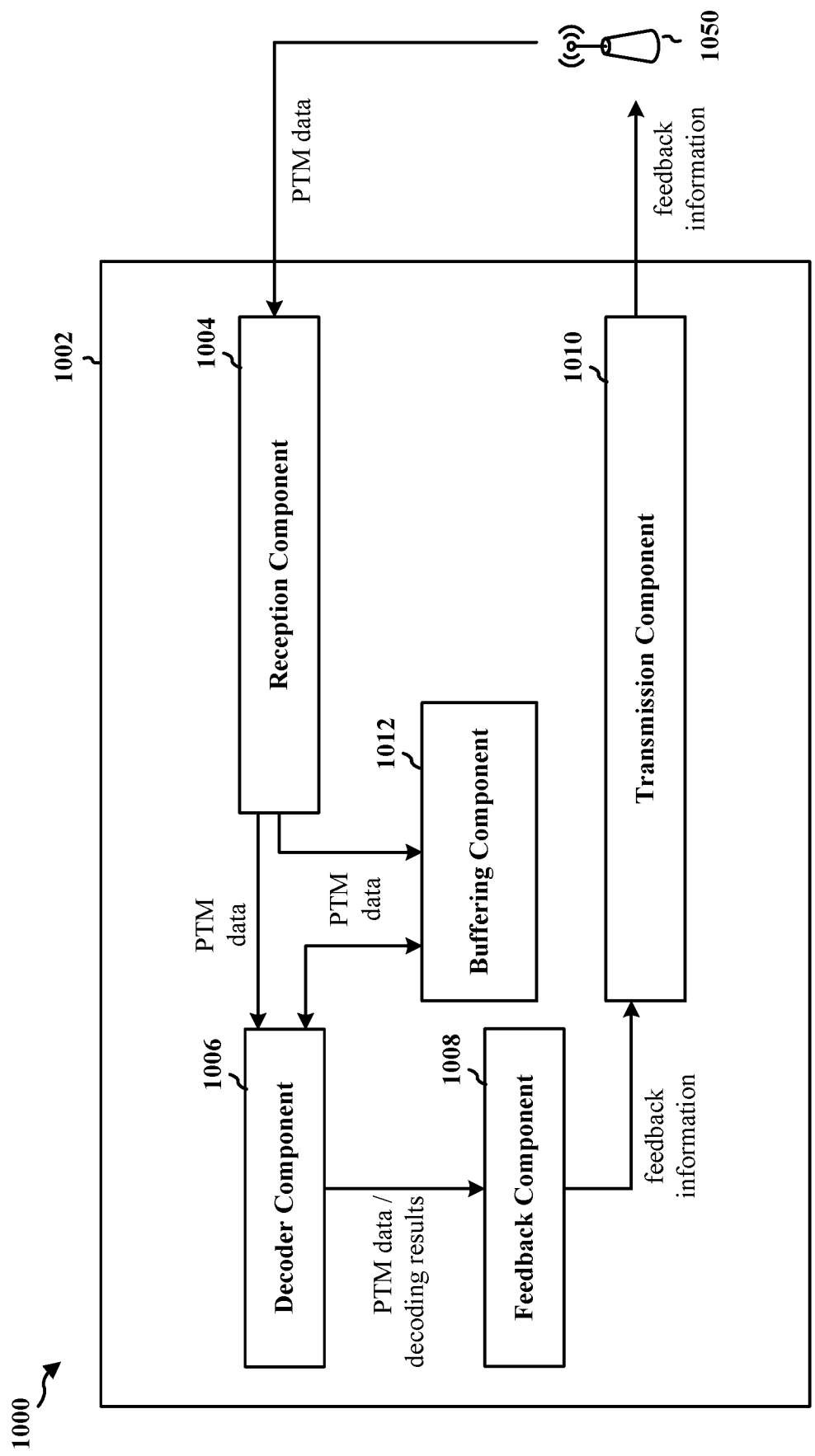
FIG. 10 is a conceptual data flow diagram illustrating the data flow between different modules/means/components in an exemplary apparatus.

FIG. 10 is a conceptual data flow diagram 1000 illustrating the data flow between different modules/means/components in an exemplary apparatus 1002. The apparatus may be a UE. The apparatus includes a reception component 1004, a decoder component 1006, a feedback component 1008, a transmission component 1010, and a buffering component 1012. The reception component 1004 may be configured to receive PTM data from a base station 1050. The decoder component 1006 may be configured to attempt to decode the PTM data based on an identifier. For example, the decoder component 1006 may use the identifier to perform a CRC on the received PTM data and provide the results to the feedback component 1008. If no errors are detected, then the decoder component 1006 may indicate to the feedback component 1008 that the decoding was successful. The decoder component 1006 may also attempt to recover the successfully decoded PTM data. If errors are detected, then the decoder component 1006 may indicate to the feedback component 1008 that the decoding was not successful. The feedback component 1008 may be configured to determine whether to transmit feedback information to the base station 1050 based on the attempt to decode the PTM data. In one configuration, the feedback component 1008 may be configured to refrain from transmitting the feedback information for PTM data to the base station 1050. In another configuration, the feedback component 1008 may be configured to refrain from transmitting the feedback information to the base station 1050 when the apparatus decodes the PTM data successfully. In another configuration, the determination may be further based on a power level of the apparatus and based on whether the apparatus has data to transmit on an uplink shared channel. The transmission component 1010 may be configured to attempt to transmit (or transmit) the feedback information for the PTM data to the base station 1050 when the apparatus does not decode the PTM data successfully. The transmission component 1010 may be configured to transmit information indicating that the UE is receiving a particular group service. The buffering component 1012 may be configured to buffer the PTM data for a period of time based on a delay. The delay may be based on an expected response time from the base station 1050 for retransmitting the PTM data. In an aspect, the buffer size may be determined based on the response times and the data rate for transmitting PTM data. In an aspect, the feedback information may be a NACK. In another aspect, the NACK for the PTM data may be transmitted on an uplink control channel resource identified in a downlink control channel message associated with the identifier. In another aspect, the NACK for the PTM data may be transmitted on an uplink control channel resource identified in semi-persistent scheduling, which enables radio resources to be semi-statically configured and allocated to a UE for a longer time period than one subframe. The semi-persistent scheduling may be associated with the identifier. In another aspect, the PTM data may be received from a secondary serving cell, and the NACK for the PTM data may be transmitted to a primary serving cell. The primary serving cell may be the cell that is initially configured during connection establishment, and control information may be transmitted on the primary serving cell. The secondary serving cell may be configured after connection establishment to provide additional radio resources, such as for data transmissions. In another aspect, the NACK for the PTM data is not transmitted based on a power control command indicated in a downlink control channel message associated with the identifier. In another aspect, the apparatus is in an idle state. In another aspect, the feedback component 1008 may be configured to refrain from transmitting unicast control information, and determine to transmit the NACK for the PTM data in an uplink channel resource associated with the identifier. In another aspect, the NACK for the PTM data may be transmitted on a scheduling request resource. In another aspect, the NACK for the PTM data may be jointly transmitted with a unicast ACK or a unicast NACK. In another aspect, the NACK for the PTM data may be jointly encoded with either the unicast ACK or the unicast NACK. In another aspect, the NACK for the PTM data may be transmitted on a channel quality indicator resource. In another aspect, the NACK for PTM data may be transmitted in parallel with unicast data or unicast control information. In another aspect, the apparatus may determine not to transmit the feedback information for the PTM data when the apparatus has unicast control information or unicast data for transmission. In another configuration, the transmission component 1010 may be configured to attempt to transmit the feedback information for the PTM data. The feedback information may be one of a reception report, a RRC feedback report, or an MDT report. In another aspect, the reception report may include at least one of a primary cell identifier, a secondary cell identifier, or an indication of whether data is received via a MBMS transmission or a PTM transmission. In another aspect, the RRC feedback report or the MDT report may include at least one of a number of received packets associated with the identifier or a number of successfully decoded packets associated with the identifier. In another aspect, the RRC feedback report or the MDT report may be transmitted based on at least one of a BLER threshold or a measurement period.

Figure 8:
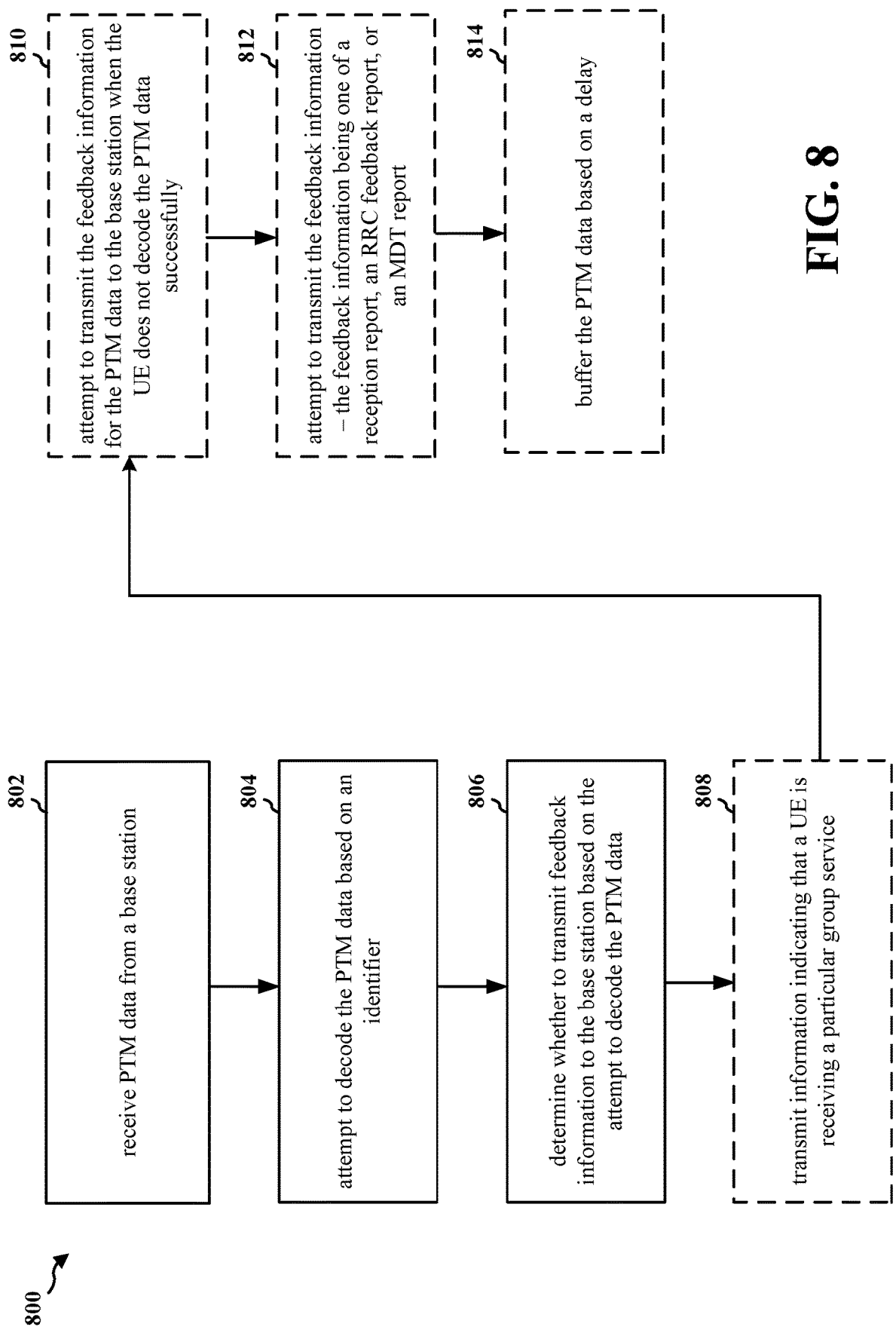
FIG. 8 is a flow chart of a method of wireless communication.

The apparatus may include additional components that perform each of the blocks of the algorithm in the aforementioned flow charts of FIG. 8. As such, each block in the aforementioned flow charts of FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
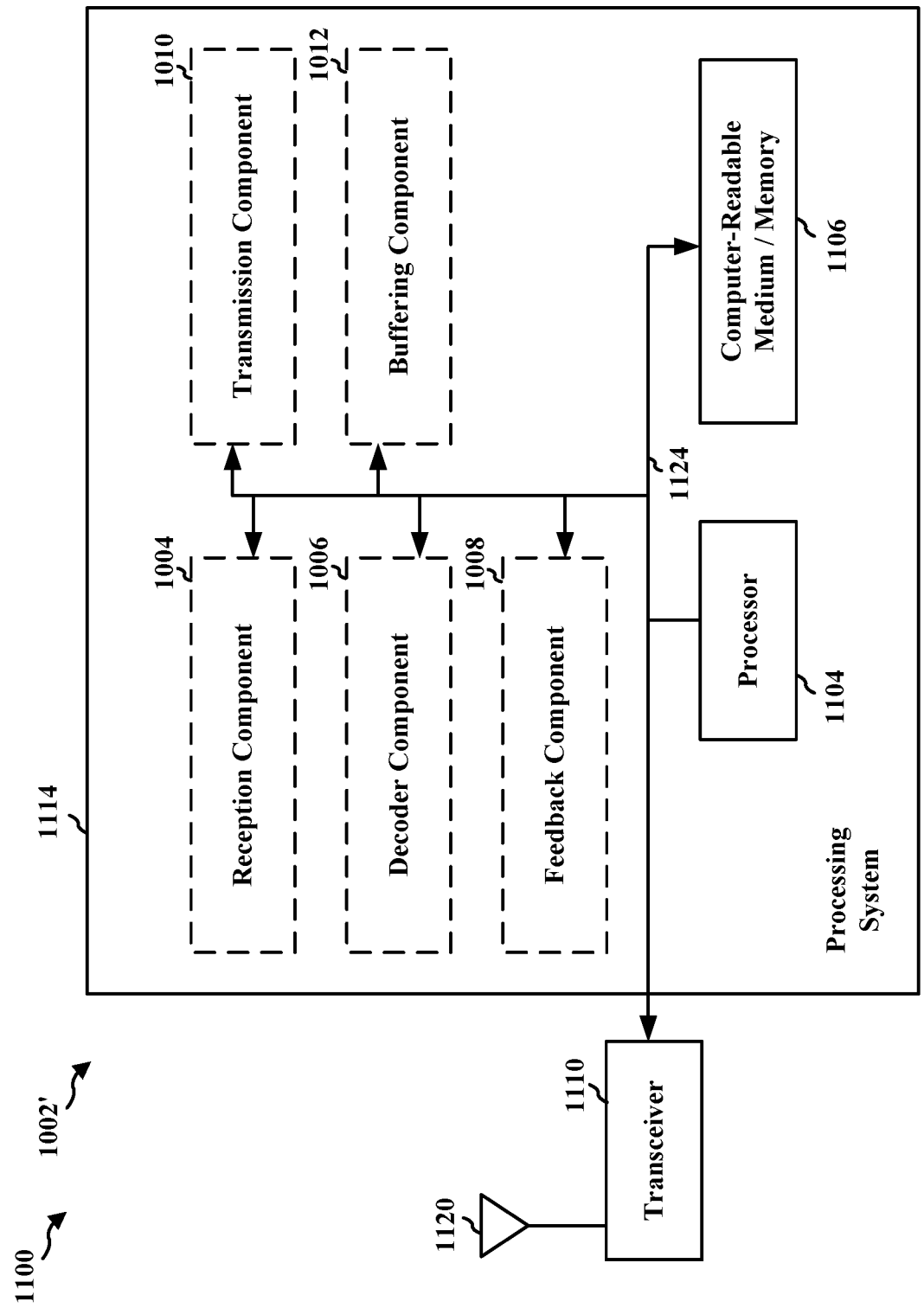
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010, 1012, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1010, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system further includes at least one of the components 1004, 1006, 1008, 1010, 1012. The components may be software components miming in the processor 1104, resident/stored in the computer readable medium/memory 1106, one or more hardware components coupled to the processor 1104, or some combination thereof. The processing system 1114 may be a component of the UE 650 and may include the memory 660 and/or at least one of the TX processor 668, the RX processor 656, and the controller/processor 659.

In one configuration, the apparatus 1002/1002' for wireless communication includes means for receiving PTM data from a base station. The apparatus includes means for attempting to decode the PTM data based on an identifier. The means for attempting to decode the PTM data may be configured to determine an appropriate identifier to be used for decoding the PTM data based on the type of service requested. After determining the appropriate identifier, the means for attempting to decode may be configured to descramble (or demask) the CRC in the PTM data based on the identifier. The means for attempting to decode the PTM data may be configured to generate a CRC based on the PTM data and compare the generated CRC with the descrambled CRC and determine whether any errors are detected. If no errors are detected, the means for attempting to decode may be configured to decode the PTM data. Otherwise, the means for attempting to decode may indicate that the decode attempt was unsuccessful. The apparatus includes means for determining whether to transmit feedback information to the base station based on the attempt to decode the PTM data. In an aspect, the means for determining whether to transmit feedback information may be configured to refrain from transmitting the feedback information to the base station. In another aspect, the means for determining whether to transmit feedback information may be configured to refrain from transmitting the feedback information to the base station when the apparatus decodes the PTM data successfully. In another aspect, the determination of whether to transmit feedback information may be based on a power level of the apparatus and based on whether the apparatus has data to transmit on an uplink shared channel. The apparatus may include means for attempting to transmit the feedback information for the PTM data to the base station when the apparatus does not decode the PTM data successfully. The means for attempting to transmit may be configured to transmit feedback information for the PTM data based on the results of the means for determining whether to transmit feedback information to the base station. For example, if the PTM data was successfully decoded, the means for attempting to transmit may be configured not to transmit feedback information. If the PTM data was not successfully decoded, the means for attempting to transmit may be configured to transmit feedback information provided that the apparatus does not have either unicast data or unicast control information to transmit. The apparatus may include means for transmitting information indicating that the apparatus is receiving a particular group service. The apparatus may include means for buffering the PTM data based on a delay. In an aspect, the means for buffering the PTM data may be configured to buffer the PTM data for a period of time based on a delay, and the delay may be based on an amount of time needed for all UEs associated with the same base station as the apparatus to send feedback information regarding the PTM data and an amount of time needed for the base station to retransmit the PTM data. The means for buffering may be configured to determine the buffer size based on the amount of data being transmitted and the data rate of the PTM data transmissions. In another aspect, the feedback information is a NACK. In another aspect, the NACK for the PTM data may be transmitted on an uplink control channel resource identified in a downlink control channel message associated with the identifier. In another aspect, the NACK for the PTM data may be transmitted on an uplink control channel resource identified in semi-persistent scheduling. The semi-persistent scheduling may be associated with the identifier. In another aspect, the PTM data may be received from a secondary serving cell, and the NACK for the PTM data may be transmitted to a primary serving cell. In another aspect, the NACK for the PTM data may not be transmitted based on a power control command indicated in a downlink control channel message associated with the identifier. In another aspect, the apparatus is in an idle state. In another aspect, the means for determining may be configured to refrain from transmitting unicast control information, and the NACK for the PTM data may be transmitted in an uplink channel resource associated with the identifier. In another aspect, the NACK for the PTM data may be transmitted on a scheduling request resource. In another aspect, the NACK for the PTM data may be jointly transmitted with a unicast ACK or a unicast NACK. In another aspect, the NACK for the PTM data may be jointly encoded with either the unicast ACK or the unicast NACK. In another aspect, the NACK for the PTM data may be transmitted on a channel quality indicator resource. In another aspect, the NACK for PTM data may be transmitted in parallel with unicast data or unicast control information. In another aspect, the apparatus may determine not to transmit the feedback information for the PTM data when the apparatus has unicast control information or unicast data for transmission. In another aspect, the apparatus may include means for attempting to transmit the feedback information. The feedback information may be one of a reception report, an RRC feedback report, or an MDT report. In another aspect, the reception report may include at least one of a primary cell identifier, a secondary cell identifier, or an indication of whether data is received via an MBMS transmission or a PTM transmission. In another aspect, the RRC feedback report or the MDT report may include at least one of a number of received packets associated with the identifier or a number of successfully decoded packets associated with the identifier. In another aspect, the RRC feedback report or the MDT report may be transmitted based on at least one of a BLER threshold or a measurement period.

The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

Figure 12:
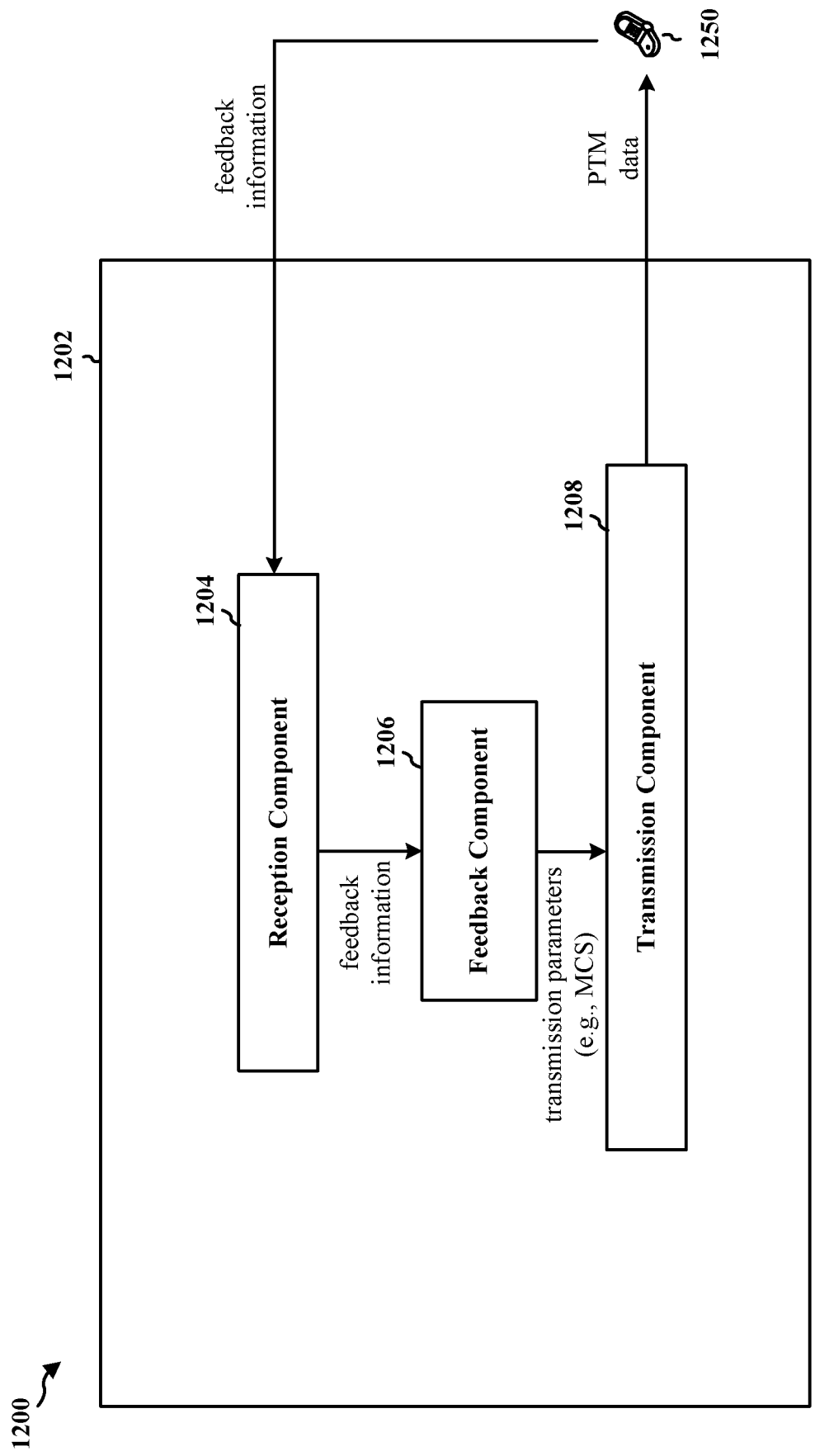
FIG. 12 is a conceptual data flow diagram illustrating the data flow between different modules/means/components in an exemplary apparatus.

FIG. 12 is a conceptual data flow diagram 1200 illustrating the data flow between different modules/means/components in an exemplary apparatus 1202. The apparatus may be a base station. The apparatus includes a reception component 1204, a feedback component 1206, and a transmission component 1208. The transmission component 1208 may be configured to transmit PTM data to a UE 1250. The transmission component 1208 may be configured to retransmit the PTM data to the UE 1250 based on feedback information associated with the transmitted PTM data. In an aspect, the retransmission may not be based on an HARQ retransmission. The reception component 1204 may be configured to receive the feedback information from the UE 1250 based on the transmitted PTM data. In an aspect, the feedback information may be a NACK or a report associated with the transmitted PTM data. In another aspect, the transmission component 1208 may be configured to retransmit the PTM data by adjusting at least one of a modulation coding scheme, a transmission mode, or a number of retransmissions of the PTM data for retransmitting the PTM data based on the feedback information. In another configuration, the transmission component 1208 may be configured to transmit a BLER threshold and/or a measurement period to the UE 1250 to enable the UE 1250 to transmit the feedback information based on the BLER threshold and/or the measurement period.

The apparatus may include additional components that perform each of the blocks of the algorithm in the aforementioned flow charts of FIG. 9. As such, each block in the aforementioned flow charts of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 13:
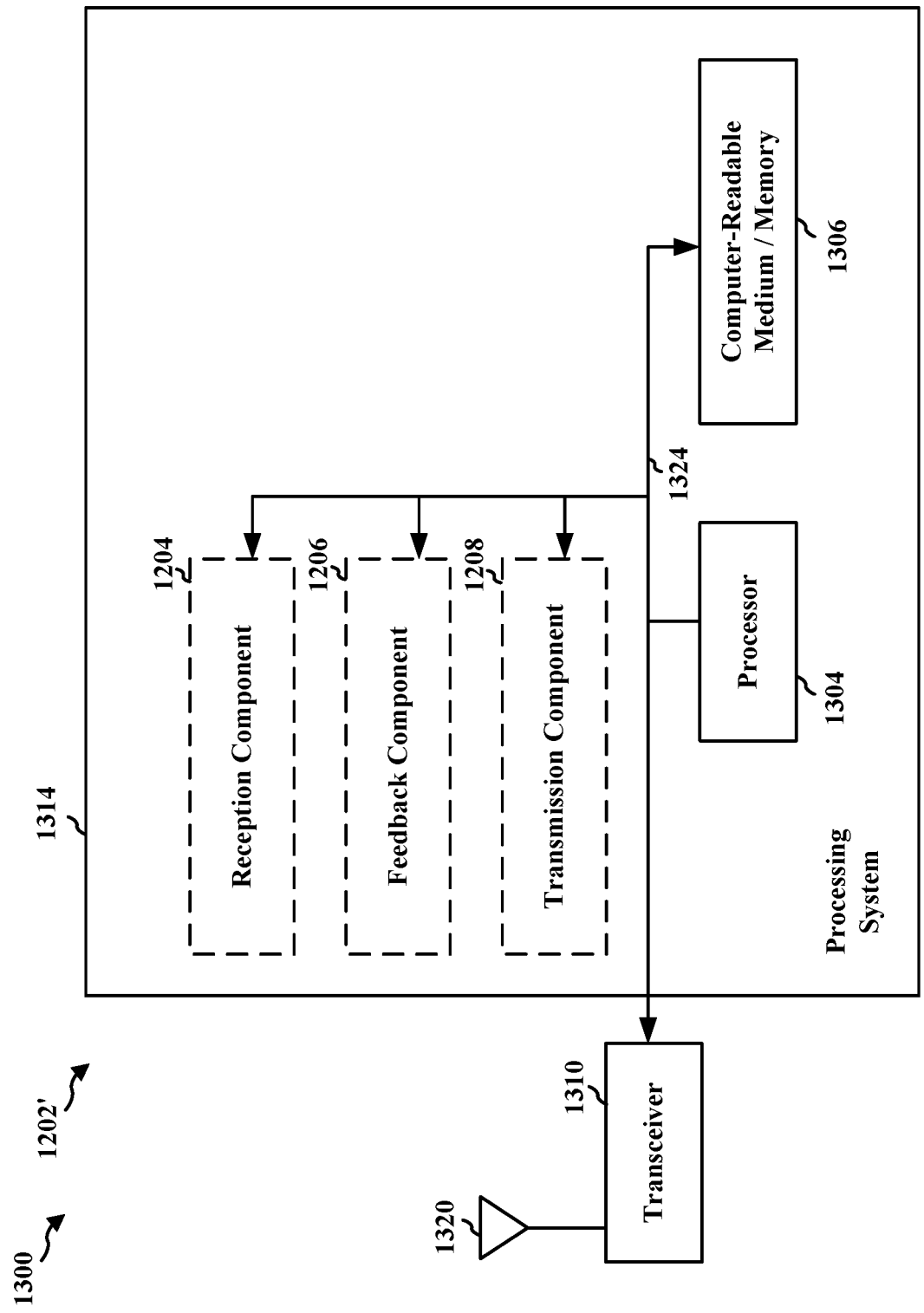
FIG. 13 is a diagram illustrating an example of a hardware implementation for an apparatus employing a processing system.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware components, represented by the processor 1304, the components 1204, 1206, 1208 and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the reception component 1204. In addition, the transceiver 1310 receives information from the processing system 1314, specifically the transmission component 1208, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system further includes at least one of the components 1204, 1206, and 1208. The components may be software components running in the processor 1304, resident/stored in the computer readable medium/memory 1306, one or more hardware components coupled to the processor 1304, or some combination thereof. The processing system 1314 may be a component of the eNB 610 and may include the memory 676 and/or at least one of the TX processor 616, the RX processor 670, and the controller/processor 675.

In one configuration, the apparatus 1202/1202' for wireless communication includes means for transmitting PTM data to a UE. The apparatus includes means for retransmitting the PTM data to the UE based on feedback information associated with the transmitted PTM data. In an aspect, the retransmission may not be based on an HARQ retransmission. The apparatus may include means for receiving the feedback information from the UE based on the transmitted PTM data. In an aspect, the feedback information may be a NACK or a report associated with the transmitted PTM data. In another aspect, the means for retransmitting the PTM data may be configured to adjust at least one of a modulation coding scheme, a transmission mode, or a number of retransmissions of the PTM data for retransmitting the PTM data based on the feedback information. For example, if the BLER is high, the means for transmitting may be configured to adjust more transmissions parameters such as increasing the number of fixed transmissions and/or change the transmission mode from a single antenna configuration to a spatial multiplexing configuration. If the BLER is low, the means for retransmitting may adjust fewer parameters such as only increasing the number of fixed retransmissions, or the means for transmitting may not adjust the parameters at all (e.g., maintain the current fixed number of retransmissions, transmission mode, and MCS). In another configuration, the apparatus may include means for transmitting a BLER threshold and/or a measurement period to the UE to enable the UE to transmit the feedback information based on the BLER threshold and/or the measurement period. The aforementioned means may be one or more of the aforementioned components of the apparatus 1202 and/or the processing system 1314 of the apparatus 1202' configured to perform the functions recited by the aforementioned means. As described supra, the processing system 1314 may include the TX Processor 616, the RX Processor 670, and the controller/processor 675. As such, in one configuration, the aforementioned means may be the TX Processor 616, the RX Processor 670, and the controller/processor 675 configured to perform the functions recited by the aforementioned means.

It is understood that the specific order or hierarchy of blocks in the processes/flow charts disclosed is an illustration of exemplary approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication by a user equipment (UE), comprising:
receiving point-to-multipoint (PTM) data from a base station, wherein the PTM data is transmitted to a group of UEs that includes the UE and that requested to receive a data service comprising the PTM data;

attempting to decode the PTM data based on an identifier;

determining whether to transmit PTM feedback information for the PTM data to the base station based on the attempting to decode the PTM data, wherein the PTM feedback information for the PTM data is configured to be included along with unicast control information in a same uplink resource; and transmitting, to the base station, information identifying that the UE is receiving the data service, wherein the information identifying that the UE is receiving the data service is configured to indicate to the base station that both the PTM feedback information for the PTM data and the unicast control information are included in the same uplink resource.

2. The method of claim 1, wherein the determining comprises refraining from transmitting the PTM feedback information to the base station.

3. The method of claim 1, wherein the determining comprises refraining from transmitting the PTM feedback information to the base station when the UE decodes the PTM data successfully.

4. The method of claim 1, wherein the determining is further based on a power level of the UE and based on whether the UE has data to transmit on an uplink shared channel.

5. The method of claim 1, further comprising attempting to transmit the PTM feedback information for the PTM data to the base station when the UE does not decode the PTM data successfully.

6. The method of claim 5, further comprising buffering the PTM data based on a delay.

7. The method of claim 5, wherein the PTM feedback information is a negative acknowledgment (NACK).

8. The method of claim 7, wherein the NACK for the PTM data is transmitted on an uplink control channel resource identified in a downlink control channel message associated with the identifier.

9. The method of claim 7, wherein the NACK for the PTM data is transmitted on an uplink control channel resource identified in semi-persistent scheduling, the semi-persistent scheduling being associated with the identifier.

10. The method of claim 7, wherein the PTM data is received from a secondary serving cell, and wherein the NACK for the PTM data is transmitted to a primary serving cell.

11. The method of claim 7, wherein the NACK for the PTM data is not transmitted based on a power control command indicated in a downlink control channel message associated with the identifier.

12. The method of claim 7, wherein the determining comprises refraining from transmitting the unicast control information, and wherein the NACK for the PTM data is transmitted in an uplink channel resource associated with the identifier.

13. The method of claim 7, wherein the NACK for the PTM data is transmitted on a scheduling request resource.

14. The method of claim 7, wherein the NACK for the PTM data is jointly transmitted with a unicast acknowledgement (ACK) or a unicast NACK.

15. The method of claim 14, wherein the NACK for the PTM data is jointly encoded with either the unicast ACK or the unicast NACK.

16. The method of claim 7, wherein the NACK for the PTM data is transmitted on a channel quality indicator resource.

17. The method of claim 7, wherein the NACK for the PTM data is transmitted in parallel with unicast data or the unicast control information.

18. The method of claim 1, wherein the UE determines not to transmit the PTM feedback information for the PTM data when the UE has the unicast control information or unicast data for transmission.

19. The method of claim 1, further comprising attempting to transmit the PTM feedback information, the PTM feedback information being one of a reception report, a radio resource control (RRC) feedback report, or a minimize driving test (MDT) report.

20. The method of claim 19, wherein the reception report includes at least one of a primary cell identifier, a secondary cell identifier, or an indication of whether data is received via a multicast broadcast multimedia stream (MBMS) transmission or a PTM transmission.

21. The method of claim 20, wherein the RRC feedback report or the MDT report includes at least one of a number of received packets associated with the identifier or a number of successfully decoded packets associated with the identifier.

22. The method of claim 20, wherein the RRC feedback report or the MDT report is transmitted based on at least one of a block error rate (BLER) threshold or a measurement period.

23. An apparatus for wireless communication, comprising:

means for receiving point-to-multipoint (PTM) data from a base station, wherein the PTM data is transmitted to a group of user equipments (UEs) that includes the apparatus and that requested to receive a data service comprising the PTM data;

means for attempting to decode the PTM data based on an identifier;

means for determining whether to transmit PTM feedback information for the PTM data to the base station based on the attempting to decode the PTM data, wherein the PTM feedback information for the PTM data is configured to be included along with unicast control information in a same uplink resource; and means for transmitting, to the base station, information identifying that the apparatus is receiving the data service, wherein the information identifying that the apparatus is receiving the data service is configured to indicate to the base station that both the PTM feedback information for the PTM data and the unicast control information are included in the same uplink resource.

24. An apparatus for wireless communication, comprising:

a memory; and at least one processor coupled to the memory and configured to:

receive point-to-multipoint (PTM) data from a base station, wherein the PTM data is transmitted to a group of user equipments (UEs) that includes the apparatus and that requested to receive a data service comprising the PTM data;

attempt to decode the PTM data based on an identifier;

determine whether to transmit PTM feedback information for the PTM data to the base station based on the attempt to decode the PTM data, wherein the PTM feedback information for the PTM data is configured to be included along with unicast control information in a same uplink resource; and transmit, to the base station, information identifying that the apparatus is receiving the data service, wherein the information identifying that the apparatus is receiving the data service is configured to indicate to the base station that both the PTM feedback information for the PTM data and the unicast control information are included in the same uplink resource.

25. The apparatus of claim 24, wherein the at least one processor is configured to determine whether to transmit the PTM feedback information by refraining from transmitting the PTM feedback information to the base station when the apparatus decodes the PTM data successfully.

26. The apparatus of claim 24, wherein the determining is further based on a power level of the apparatus and based on whether the apparatus has data to transmit on an uplink shared channel.

27. The apparatus of claim 24, wherein the at least one processor is further configured to attempt to transmit the PTM feedback information for the PTM data to the base station when the apparatus does not decode the PTM data successfully.

28. A non-transitory computer-readable medium storing computer executable code for wireless communication by a user equipment (UE), comprising code for:
    receiving point-to-multipoint (PTM) data from a base station, wherein the PTM data is transmitted to a group of UEs that includes the UE and that requested to receive a data service comprising the PTM data;
    attempting to decode the PTM data based on an identifier;
    determining whether to transmit PTM feedback information for the PTM data to the base station based on the attempting to decode the PTM data, wherein the PTM feedback information for the PTM data is configured to be included along with unicast control information in a same uplink resource; and
    transmitting, to the base station, information identifying that the UE is receiving the data service, wherein the information identifying that the UE is receiving the data service is configured to indicate to the base station that both the PTM feedback information for the PTM data and the unicast control information are included in the same uplink resource.

* * * * *